US 11,173,419 B2

(12) United States Patent
Das et al.

(10) Patent No.: US 11,173,419 B2
(45) Date of Patent: Nov. 16, 2021

(54) DESALTER INLET DISTRIBUTOR DESIGNS AND METHODS

(71) Applicant: ExxonMobil Research and Engineering Company, Annandale, NJ (US)

(72) Inventors: Sandipan K. Das, Spring, TX (US); Andrew P. Sullivan, Kingwood, TX (US); Magaly C. Barroeta, Tomball, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/539,283

(22) Filed: Aug. 13, 2019

(65) Prior Publication Data
US 2020/0061496 A1 Feb. 27, 2020

Related U.S. Application Data

(60) Provisional application No. 62/720,164, filed on Aug. 21, 2018.

(51) Int. Cl.
*B01D 17/00* (2006.01)
*B01D 17/02* (2006.01)
(Continued)

(52) U.S. Cl.
CPC ......... *B01D 17/0208* (2013.01); *C10G 31/08* (2013.01); *C10G 33/02* (2013.01);
(Continued)

(58) Field of Classification Search
CPC ....... B01F 5/0615; C10G 33/02; C10G 33/04; C10G 33/06; C10G 31/08;
(Continued)

(56) References Cited

U.S. PATENT DOCUMENTS

| 7,264,394 | B1 | 9/2007 | Liles |
| 9,486,812 | B2 | 11/2016 | Lean et al. |

(Continued)

FOREIGN PATENT DOCUMENTS

| WO | 2008072087 A2 | 6/2008 |
| WO | WO 2008072087 | * 6/2008 |

OTHER PUBLICATIONS

The International Search Report and Written Opinion of PCT/US2019/046313 dated Sep. 25, 2019.

*Primary Examiner* — Prem G Singh
*Assistant Examiner* — Brandi M Doyle
(74) *Attorney, Agent, or Firm* — Glenn T. Barrett

(57) ABSTRACT

A crude oil desalter unit includes a settler, an inlet manifold fluidly coupled to the settler, and one or more inlet distributors extending from the inlet manifold to discharge a water-in-oil emulsion into the settler. Each inlet distributor includes a riser having a first end, a second end, and an inner flowpath extending between the first and second ends, wherein the riser is coupled to the inlet manifold at the first end, one or more outlet nozzles provided at the second end and in fluid communication with the inner flowpath, and a static mixer positioned within the inner flowpath and defining one or more helical pathways operable to induce rotational flow to a fluid flowing within the inner flowpath.

9 Claims, 5 Drawing Sheets

(51) Int. Cl.
  *C10G 31/08*  (2006.01)
  *C10G 33/02*  (2006.01)
  *C10G 33/06*  (2006.01)
  *C10G 33/04*  (2006.01)
  *B01D 17/06*  (2006.01)
  *B01D 17/04*  (2006.01)

(52) U.S. Cl.
  CPC .............. *C10G 33/04* (2013.01); *C10G 33/06* (2013.01); *B01D 17/047* (2013.01); *B01D 17/06* (2013.01); *C10G 2300/1033* (2013.01)

(58) Field of Classification Search
  CPC ........ C10G 2300/1033; B01D 17/0208; B01D 17/0211; B01D 17/0214; B01D 17/0217; B01D 17/04; B01D 17/045; B01D 17/047; B01D 17/06; B01D 19/0057
  See application file for complete search history.

(56) References Cited

U.S. PATENT DOCUMENTS

| | | |
|---|---|---|
| 2003/0217971 A1* | 11/2003 | Varadaraj et al. |
| 2011/0031124 A1 | 2/2011 | Hana |
| 2016/0046876 A1 | 2/2016 | Hussain et al. |

* cited by examiner

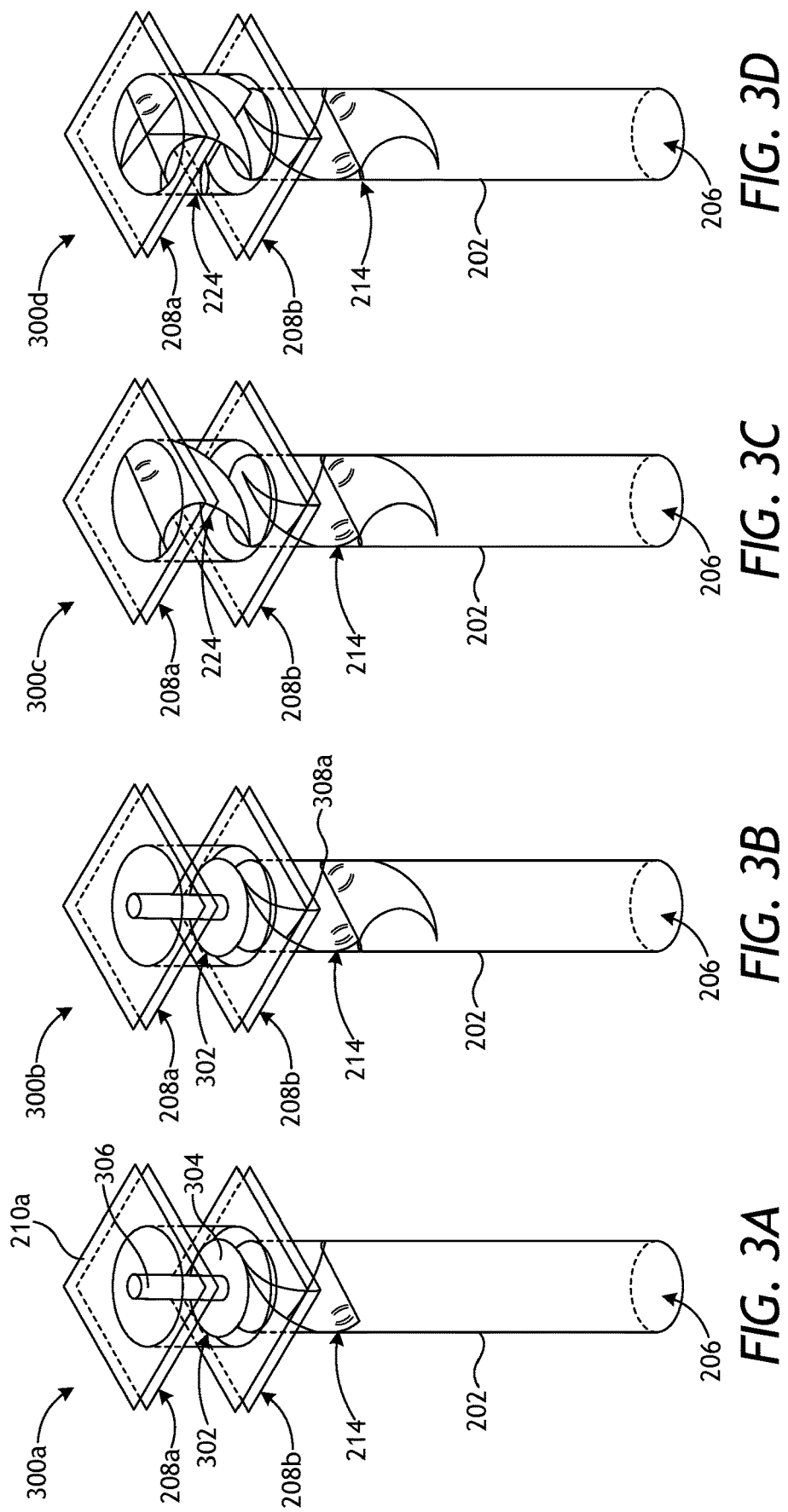

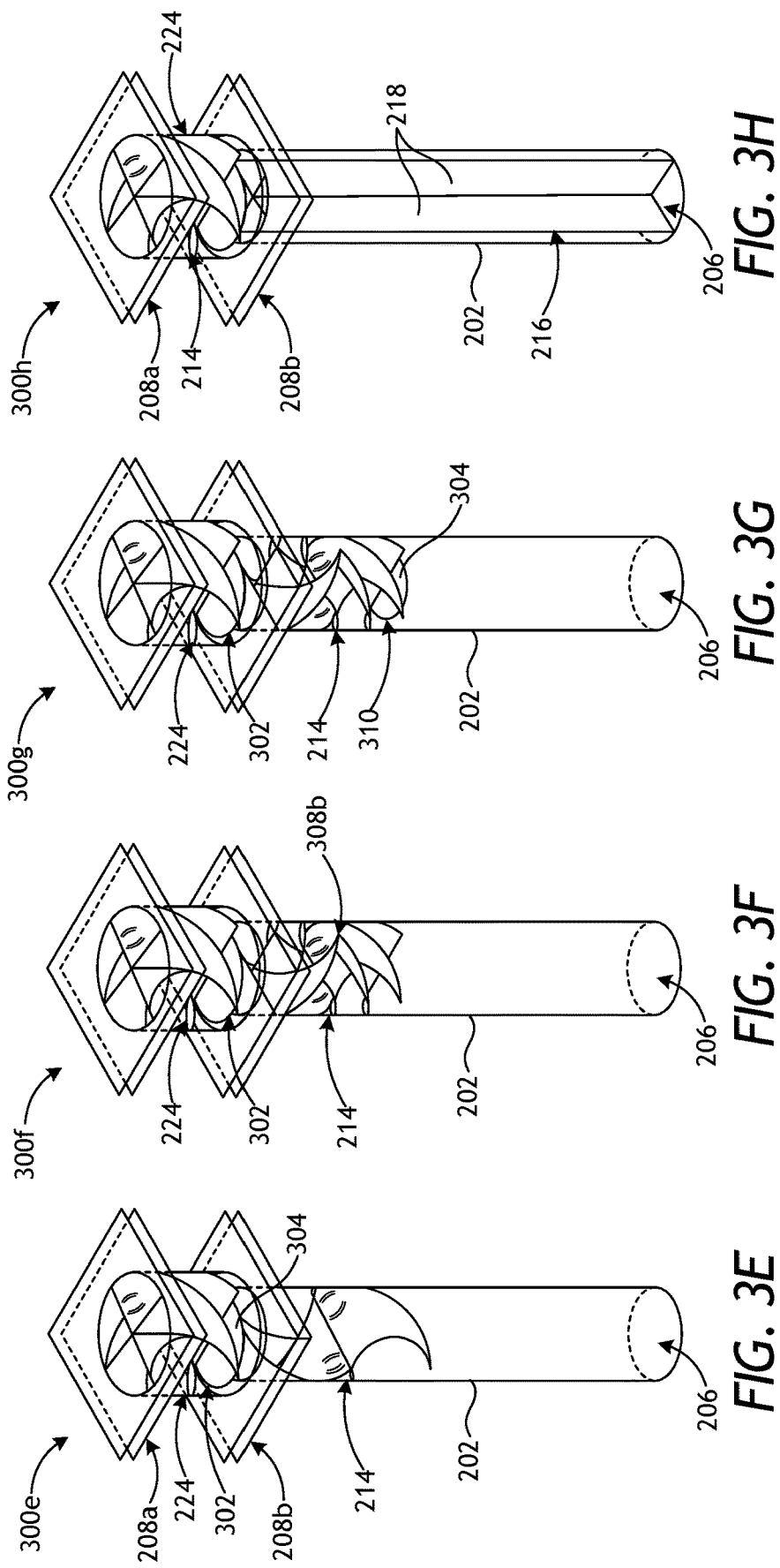

DESALTER INLET DISTRIBUTOR DESIGNS AND METHODS

CROSS REFERENCE TO RELATED APPLICATIONS

This application claims priority to U. S. Provisional Application Serial No. 62/720,164 filed Aug. 21, 2018, which is herein incorporated by reference in its entirety.

BACKGROUND

Crude oil normally contains impurities like water, salts in solution, and solid particulate matter. Impurities can corrode and build up solid deposits in refinery units, and thus should be removed before the crude oil is refined.

Crude oil impurities are commonly removed by a process known as "desalting," in which the crude oil is mixed with water and a suitable demulsifying agent to form a water-in-oil emulsion. The emulsion provides intimate contact between the oil and the water so that the salts pass into solution in the water. The emulsion is then often subjected to a high voltage electrostatic field inside a closed separator vessel, often referred to as a "settler." The electrostatic field helps coalesce and break the emulsion into an oil phase and a water phase. The oil phase rises to the top of the settler and forms an upper layer that is continuously drawn off. The water phase (commonly called "brine") sinks to the bottom of the settler from where it is also continuously removed.

The water-in-oil emulsion is introduced into the desalter via one or more inlet distributors that extend into the settler and terminate at one or more outlet nozzles designed to eject the emulsion into the interior of the settler. Modifying the design and/or function of the inlet distributors may increase the efficiency of a desalter unit.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 3A-3K are isometric views of varying embodiments of the inlet distributor of FIG. 2, in accordance with the principles of the present disclosure.

DETAILED DESCRIPTION

The present disclosure is related to crude oil desalting and, more particularly, to desalting unit inlet distributors designed to promote and enhance water droplet coalescence from a water-in-oil emulsion prior to discharge from the inlet distributors.

The present disclosure describes improved designs for inlet distributors used to discharge a water-in-oil emulsion into a settler of a crude oil desalter unit. An example inlet distributor may include a riser having a first end, a second end, and an inner flowpath extending between the first and second ends. One or more outlet nozzles may be provided at the second end of the riser and in fluid communication with the inner flowpath. At least one static mixer may be positioned within the inner flowpath and may define one or more helical pathways operable to induce rotational flow to the water-in-oil emulsion flowing within the inner flowpath. In some embodiments, the inlet distributor may further include a vertical baffle arranged within the inner flowpath and in fluid communication with the static mixer. The vertical baffle may include one or more longitudinally extending walls that divide the inner flowpath into a plurality of longitudinal flow channels. The static mixer and optionally the vertical baffle may help commence water droplet coalescence before the emulsion is discharged from the riser. As a result, larger water droplets may be initially discharged into the settler, which may enhance (accelerate) settling time of the separated salt-laden water.

Figure 1:
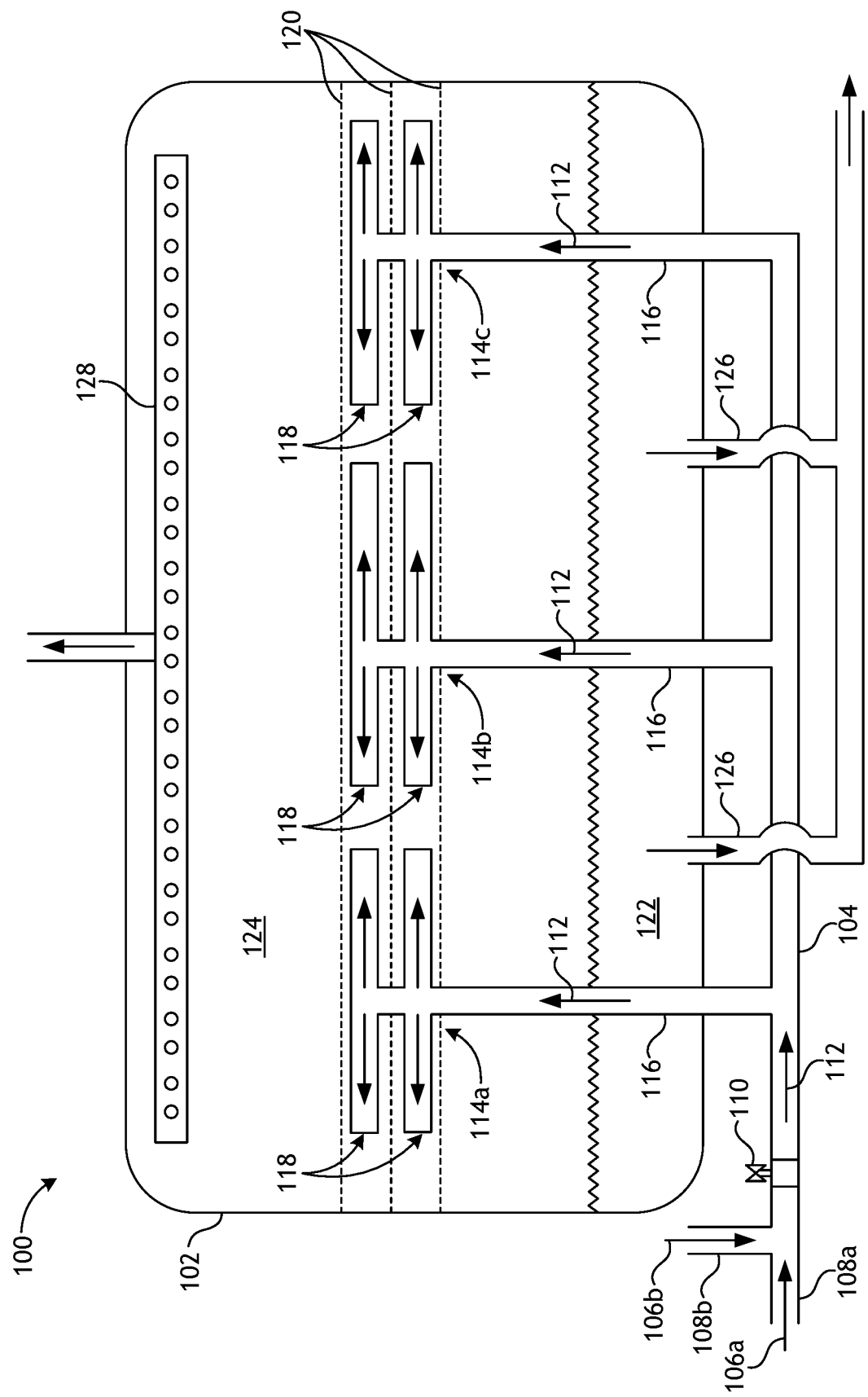
FIG. 1 is a schematic diagram of an example crude oil desalter unit.

FIG. 1 is a schematic diagram of an example crude oil desalter unit 100, according to one or more embodiments. Desalting is one of the first steps in refining crude oil, and is primarily done to remove salts and particulates to reduce corrosion, fouling, and catalyst poisoning. As illustrated, the crude oil desalter unit 100 (hereafter the "desalter 100") includes a desalter separator vessel or "settler" 102 fluidly coupled to an inlet manifold 104. The inlet manifold 104 receives crude oil 106a (or a crude oil blend) through a first fluid line 108a and water 106b through a second fluid line 108b. The crude oil 106a and the water 106b may be vigorously mixed together through a mixing valve 110 or other equivalent device to produce a water-in-oil emulsion 112. The emulsion 112 ensures good contact between the crude oil 106a and the water 106b to favor removal of soluble salts by the water 106b as well as promoting separation of solids that may be present in the crude oil 106a.

The water 106b, sometimes referred to as "wash water," may be derived from various sources. For example, the water 106b may include, but is not limited to, recycled refinery water, recirculated wastewater, clarified water, purified wastewater, sour water stripper bottoms, overhead condensate, boiler feed water, clarified river water, other fresh water sources, or any combination thereof. Although deionized water may be used to favor exchange of salt from the crude oil 106a into the aqueous solution, deionized water is not required to desalt petroleum feedstocks. However, deionized water may be mixed with recirculated water from the desalter to achieve a specific ionic content in either the water 106b before emulsification or to achieve a specific ionic strength in the final emulsified product. Frequently, a variety of water sources are mixed as determined by cost requirements, supply, salt content of the water 106b, salt content of the crude oil 106a, and other factors specific to the desalting conditions such as the size of the settler 102 and the degree of desalting required.

The water-in-oil emulsion 112 may be fed into the settler 102 via one or more inlet distributors extending from the inlet manifold 104 and depicted as a first inlet distributor 114a, a second inlet distributor 114b, and a third inlet distributor 114c. While three inlet distributors 114a-c are depicted in FIG. 1, more or less than three may be employed. Moreover, the inlet distributors 114a-c are depicted as extending into the settler 102 through the bottom of the desalter 100, but it is contemplated herein for one or more of the inlet distributors 114a-c to alternatively enter from the top of the desalter 100, without departing from the scope of the disclosure. Furthermore, while FIG. 1 depicts the inlet distributors 114a-c as penetrating the bottom wall of the settler 102 at discrete locations, embodiments are contemplated herein where the inlet manifold 104 instead penetrates the settler 102 via a single flow line and the inlet distributors 114a-c branch off from the inlet manifold 104 within the settler 102.

Each inlet distributor 114a-c includes a riser 116 fluidly coupled to and extending from the inlet manifold 104 (either directly or from a branched portion of the inlet manifold 104), and terminating in one or more outlet nozzles 118. In the illustrated embodiment, each inlet distributor 114a-c includes two outlet nozzles 118, but more or less than two may be employed, without departing from the scope of the disclosure. In some embodiments, each inlet distributor 114a-c may have the same design and thus function similarly. In other embodiments, however, at least one inlet distributor 114a-c may exhibit a different design, without departing from the scope of the disclosure.

The water-in-oil emulsion 112 may be circulated through the risers 116 and ejected from the outlet nozzles 118 and into the settler 102. Based on density differences, water droplets begin to coalesce and separate from the petroleum within the settler 102. To enhance or otherwise accelerate the coalescence of the water droplets within the settler 102, the ejected emulsion 112 may be subjected to an electrostatic field generated by one or more energized electrodes 120 (three shown) arranged within the settler 102. The electrostatic field accelerates separation of the emulsion 112 into an aqueous phase 122 that settles near the bottom of the settler 102 and an oil phase 124 that rises to the top of the settler 102. While three electrodes 120 are depicted in FIG. 1, more or less than three may be employed.

The aqueous phase 122 essentially consists of large electrocoalesced water and/or brine droplets containing dissolved salts and some solids derived from the crude oil 106a. The aqueous phase 122 may be continuously withdrawn from the settler 102 via various drawoff nozzles or an internal header. In the illustrated embodiment, aqueous phase 122 may be withdrawn from the bottom of the settler 102 via one or more outlet lines 126 (two shown) and further processed in a water treatment plant. While two outlet lines 126 are depicted in FIG. 1, more or less than two may be employed. In other applications, the outlet lines 126 may be replaced by a perforated internal header or manifold extending longitudinally along the bottom of the settler 102 and fluidly coupled to a single flow line that penetrates the wall of the settler 102. The oil phase 124 may be continuously withdrawn from the top of the settler 102 via an outlet manifold 128. In some applications, the oil phase 124 may be sent to an atmospheric distillation unit (not shown) for further processing into feedstocks for motor fuel, lubricants, asphalt, and other ultimate products and uses such as petrochemical production.

Figure 2:
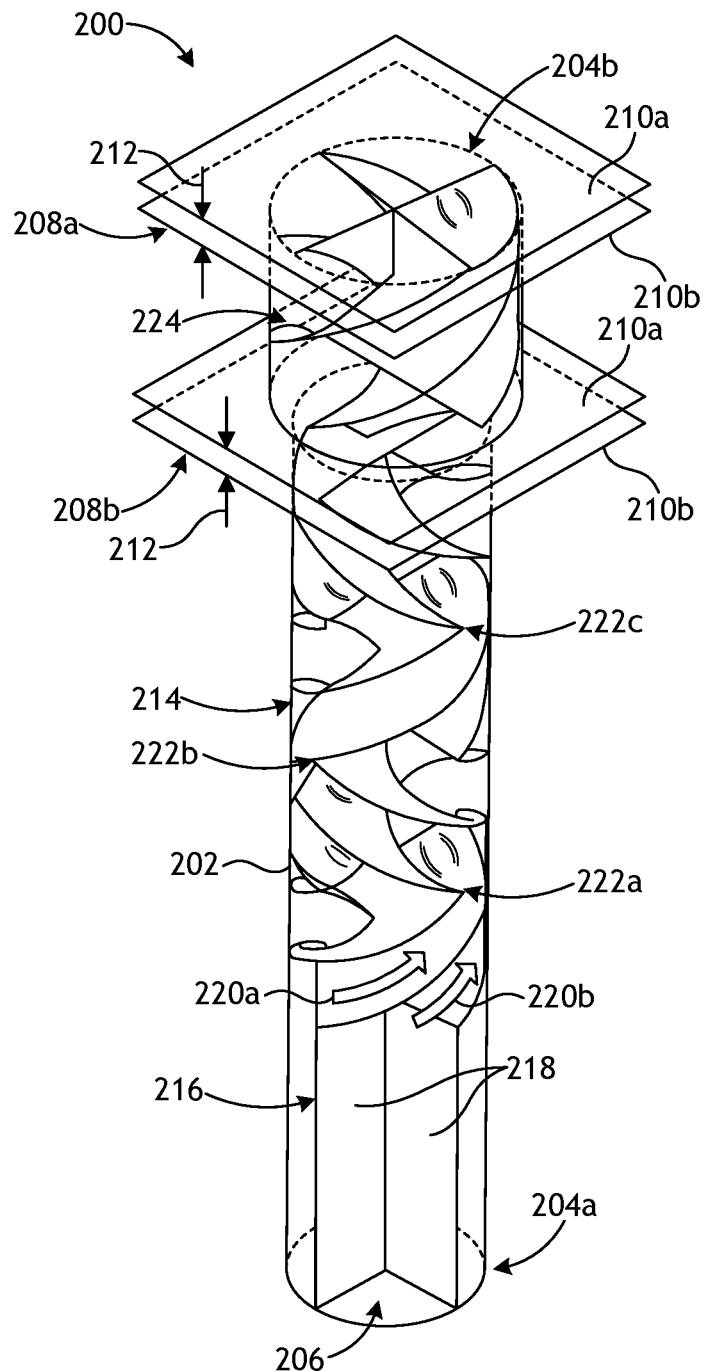
FIG. 2 is an isometric view of an example inlet distributor, according to one or more embodiments of the present disclosure.

FIG. 2 is an enlarged isometric view of an example inlet distributor 200, according to one or more embodiments of the present disclosure. The inlet distributor 200 may be the same as or similar to any of the inlet distributors 114a-c of FIG. 1 and, therefore, may be used in conjunction with the desalter 100 (FIG. 1). As illustrated, the inlet distributor 200 includes a riser 202 that has a first or "bottom" end 204a and a second or "top" end 204b opposite the first end 204a. The riser 202 may be, for example, a substantially straight pipe that defines an inner flowpath 206 through which the emulsion 112 (FIG. 1) may flow to be discharged into the settler 102 (FIG. 1). The length of the riser 202 between the first and second ends 204a,b may vary depending on the application and the size of the desalter where the inlet distributor 200 will be used. The length of the riser 202, for example, may range between about one foot and about eight feet, but could be shorter than one foot or longer than eight feet, without departing from the scope of the disclosure.

The first end 204a of the riser 202 may be fluidly coupled to the inlet manifold 104 (FIG. 1) such that the emulsion 112 (FIG. 1) can be circulated into the inlet distributor 200. One or more outlet nozzles may be provided or otherwise defined at the second end 204b of the riser 202 of each inlet distributor 200. In the illustrated embodiment, the inlet distributor 200 includes a first or "upper" outlet nozzle 208a and a second or "lower" outlet nozzle 208b axially offset from the upper outlet nozzle 208a along the length of the riser 202. In other embodiments, however, only one outlet nozzle 208a,b may be included in the inlet distributor 200, without departing from the scope of the disclosure.

Each outlet nozzle 208a,b may include upper and lower plates 210a and 210b, respectively, extending radially outward from the outer circumference of the riser 202. In the illustrated embodiment, the upper and lower plates 210a,b comprise polygonal (e.g., square) discs. In other embodiments, however, the upper and lower plates 210a,b may alternatively comprise other geometric shapes including, but not limited to, circular, oval, ovoid, other polygonal shapes (e.g., triangular, rectangular, pentagonal, etc.), or any combination thereof.

The upper and lower plates 210a,b are axially offset from each other such that a gap 212 is defined therebetween. The gap 212 may be in fluid communication with the inner flowpath 206 via a horizontal slot defined in the wall of the riser 202 between the upper and lower plates 210a,b. Consequently, the emulsion 112 (FIG. 1) flowing within the inner flowpath 206 may be able to exit the riser 202 by flowing through the horizontal slot and into the gap 212 between the upper and lower plates 210a,b. The upper and lower plates 210a,b essentially provide a flat fan structure that produces an effluent planar jet that simultaneously exits the gap 212 circumferentially at all radial angles.

According to embodiments of the present disclosure, the inlet distributor 200 may be configured (designed) to enhance the performance of a desalting unit (e.g., the desalter 100). More specifically, upon exiting the inlet distributor 200, the oil and the water included in the emulsion 112 (FIG. 1) will start to separate by gravity based on density differences. Application of the electrostatic field using the electrodes 120 (FIG. 1) helps increase the rate of water droplet coalescence, which accelerates separation of the water and the oil. To enable faster settling of the coalescing water in the desalter 100 (along with any associated solids), the inlet distributor 200 may be modified to commence water droplet coalescence before the emulsion 112 is discharged from the riser 202. As a result, larger water droplets may be initially discharged into the settler 102 (FIG. 1), which enhances (accelerates) settling rate of the salt-laden water. As will be appreciated, this may lower the amount of water and water-soluble salts exiting the settler 102 (FIG. 1) with the oil phase 124 (FIG. 1) via the outlet manifold 128 (FIG. 1).

In the illustrated embodiment, the inlet distributor 200 may further include one or more structures positioned within the inner flowpath 206 to help promote coalescence of water droplets from the emulsion 112 (FIG. 1). More specifically, at least one static mixer 214 may be arranged within the inner flowpath 206 at a location between the first and second ends 204a,b of the riser 202. Moreover, in some embodiments, a vertical baffle 216 may also be arranged within the inner flowpath 206 at a location between the first and second ends 204a,b and in fluid communication with the static mixer(s) 214. In the illustrated embodiment, the vertical baffle 216 extends from the first end 204a of the riser 202 and the static mixer(s) 214 extends from the vertical baffle 216 to the second end 204b.

The vertical baffle 216 may comprise an elongated structure that divides the inner flowpath 206 into a plurality of longitudinal flow channels. In the illustrated embodiment, the vertical baffle 216 includes four longitudinally-extending walls 218 (two visible) that divide the inner flowpath 204 into four longitudinal flow channels that receive and convey the emulsion 112 (FIG. 1) to the static mixer(s) 214. As described below, however, variations of the vertical baffle 216 can include more or less than four walls 218, without departing from the scope of the disclosure. In some embodiments, the walls 218 may be equidistantly spaced from each other, thus dividing the inner flowpath 206 into equally-sized longitudinal flow channels. In other embodiments, however, the walls 218 may be non-equidistantly spaced from each other, thus dividing the inner flowpath 206 into dissimilarly sized longitudinal flow channels.

The static mixer 214 may comprise a type of structure or baffle designed to induce swirl or rotational flow to the emulsion 112 (FIG. 1) as it flows through the inner flowpath 206. In some embodiments, for example, the static mixer 214 may provide one or more helical pathways or a portion of a helical pathway through which the emulsion 112 may flow. The helical pathway(s) may extend, for example, over one or more full revolutions, three-quarters of a full revolution, half of a full revolution, a quarter of a full revolution, or any range therebetween. As used herein, the term "full revolution" refers to a complete 360° angular direction change.

In some embodiments, the static mixer 214 may define a single helical pathway for the emulsion 112 (FIG. 1) to traverse within the inner flowpath 206 along an axial length of the riser 202. In other embodiments, however, the static mixer 214 may define or otherwise provide multiple helical pathways extending in parallel along an axial length of the riser 202. In the illustrated embodiment, for example, the static mixer 214 defines at least a first helical pathway and a second helical pathway, as indicated by the arrows 220a and 220b, respectively. The first and second helical pathways 220a,b may each receive a portion of the emulsion 112 and simultaneously induce swirl or rotational flow to the corresponding portions of the emulsion 112 along an axial length of the riser 202.

Urging the emulsion 112 (FIG. 1) to traverse (i.e., flow through) a helical pathway may subject the emulsion 112 to centrifugal forces that help separate the water from the oil. More specifically, centrifugal forces assumed by the emulsion 112 may encourage higher-density fluid components (e.g., the water) to separate from lower-density fluid components (e.g., the oil) and coalesce near the inner wall of the riser 202. Moreover, it has been observed that water droplets tend to coalesce more readily at or near wall surface areas, and, as compared to conventional inlet distributors, the static mixer 214 provides substantially more wall surface area (including the walls that define the helical pathway(s)) where the water can gather and coalesce.

The helical pathway(s) provided by the static mixer 214 may exhibit constant or variable helical characteristics. In some embodiments, for example, the lead and/or the pitch of the helical pathway(s) of the static mixer 214 may be constant along all or a portion of the axial length of the static mixer 214. In other embodiments, the lead and/or the pitch of the helical pathway(s) may vary along all or a portion of the axial length of the static mixer 214, without departing from the scope of the disclosure.

In some embodiments, the static mixer 214 may change (e.g., reverse) rotational direction at one or more axial locations along the length of the riser 202. In the illustrated embodiment, for example, the static mixer 214 changes rotational direction at a first axial location 222a, a second axial location 222b, and a third axial location 222c. At each axial location 222a-c, the helical pathway(s) of the static mixer 214 reverses rotational direction such that the emulsion 112 (FIG. 1) flowing therethrough is correspondingly forced to change rotational direction (e.g., changing flow direction from clockwise to counter-clockwise, or from counter-clockwise to clockwise). Changing rotational direction in the helical pathway(s) may also promote (enhance) water droplet coalescence within the static mixer 214 and prior to being discharged from the riser 202.

In some embodiments, the static mixer 214 may include a plurality of static mixers arranged in series within the inner flowpath 206. In the illustrated embodiment, for example, a discrete static mixer may start/end at each axial location 222a-c such that the emulsion 112 (FIG. 1) may consecutively flow through the serially arranged static mixers as it traverses the inner flowpath 206. Each discrete static mixer may exhibit the same or dissimilar helical characteristics.

In at least one embodiment, the static mixer 214 may include an upper static mixer 224 positioned between the upper and lower nozzles 208a,b. In some embodiments, the upper static mixer 224 may form an integral part or extension of the static mixer 214. In other embodiments, however, the upper static mixer 224 may comprise a separate or discrete structure from the static mixer 214. In such embodiments, the upper static mixer 224 may exhibit the same or dissimilar helical characteristics as the static mixer 214. In some embodiments, the helical pathway(s) of the upper static mixer 224 may extend in the opposite rotational direction as compared to the helical pathway(s) of the preceding portion of the static mixer 214.

To measure and assess the effectiveness of including the static mixer 214 and/or the vertical baffle 216 within the riser 202, computational fluid dynamic (CFD) models were developed to predict the behavior of an oil and water mixture (e.g., the emulsion 112 of FIG. 1) flowing through an inlet distributor for a desalter. The oil and water mixture is known to flow through the riser 202 in the form of water droplets suspended in crude oil. The CFD models used physical submodels that model the breakage and coalescence of the water droplets as they moved through the inner flowpath 206. This allowed for a prediction of the water droplet sizes at the upper and lower outlet nozzles 208a,b given the droplet size distribution flowing into the riser 202.

The accuracy of these CFD models was verified (validated) by conducting physical experiments with desalter risers constructed of clear materials, two immiscible liquids representing crude oil and water, a closed loop system to recirculate/separate the liquids, and a detection system designed to measure droplet sizes at various points in the system. The droplet sizes were measured immediately outside of the riser 202 at various vertical distances within the gap 212 between the upper and lower plates 210a,b.

Using the validated CFD model(s), the performance of the inlet distributor 200 was measured against the performance of two prior art inlet distributors A and B to assess the effectiveness of including the static mixer 214 and/or the vertical baffle 216 in the riser 202. The prior art distributors A and B provided essentially the same design as the inlet distributor 200, but lacking the static mixer 214 and the baffle 216. Table 1 below provides the resulting CFD data, which indicates significant improved performance of the inlet distributor 200 of FIG. 2 as compared to the prior art inlet distributors A and B.

TABLE 1

|  | Prior Art Inlet Distributor A | Prior Art Inlet Distributor B | Inlet Distributor 200 |
|---|---|---|---|
| Inlet Sauter Mean Diameter (microns) | 101 | 82 | 82 |
| Exit Sauter Mean Diameter (microns) | 81 | 173 | 219 |

Table 1 reports the Sauter mean diameter droplet size at the inlet to the inlet distributors (i.e., the first end 204a of the riser 202), in contrast to the Sauter mean diameter droplet size at the exit (i.e., the upper and lower outlet nozzles 208a,b) as predicted by the validated CFD model(s). As will be appreciated, the key performance metric is the increase in droplet size at the exit. Table 1 indicates that the droplet size in the first prior art inlet distributor A actually decreases, while the second prior art inlet distributor B and the inlet distributor 200 show an increase of 111% and 167%, respectively, as compared to the inlet size. Moreover, the performance of the inlet distributor 200 resulted in a droplet size increase of 27% over the second prior art inlet distributor B. This translates to an increase in the ideal settling velocity (calculated by Stokes law) of the droplets in a desalter by around 60%.

FIGS. 3A-3K are isometric views of varying embodiments of the inlet distributor 200 of FIG. 2, in accordance with the principles of the present disclosure. More specifically, FIGS. 3A-3K depict inlet distributors 300a-300k, respectively, each of which include one or more structures positioned within the inner flowpath 206 to help promote coalescence of water droplets from the emulsion 112 (FIG. 1). In each inlet distributor 300a-k, at least one static mixer 214 may be arranged within the inner flowpath 206 at a location between the first and second ends 204a,b (FIG. 2) of the riser 202. In some embodiments, a vertical baffle 216 may also be arranged within the inner flowpath 206 at a location between the first and second ends 204a,b and in fluid communication with the static mixer 214.

In FIG. 3A, the inlet distributor 300a includes the static mixer 214 arranged within the riser 202 axially below the lower outlet nozzle 208b. The depicted static mixer 214 provides a single helical pathway for the emulsion 112 (FIG. 1) to traverse. The inlet distributor 300a may also include at least one baffle 302 configured to create a pressure drop that helps distribute fluid flow between both outlet nozzles 208a,b. In the illustrated embodiment, the baffle 302 is positioned within the inner flowpath 206 and comprises a disc 304 centrally located within the inner flowpath 206 and positioned axially between the upper and lower outlet nozzles 208a,b. Accordingly, the baffle 216 may be referred to herein as a "center baffle."

In some embodiments, the disc 304 may be coupled to an end of a support rod 306 coupled to and extending from the upper plate 210a. In other embodiments, the disc 304 may be secured to other structures, such as the inner wall of the riser 202. The disc 304 may have a smaller outer diameter than the inner diameter of the riser 202. Consequently, fluids flowing within the inner flowpath 206 may be able to bypass (flow around) the disc 304 in the annular region defined between the disc 304 and the inner wall of the riser 202. The center baffle 302 may essentially operate as a restriction to fluid flow that promotes flow out of the lower outlet nozzle 208b so that all flow (or a majority of the flow) does not exit via the upper outlet nozzle 208a.

In FIG. 3B, the inlet distributor 300b includes the static mixer 214, which changes (e.g., reverses) rotational direction at an axial location 308a along the length of the riser 202. The static mixer 214 may provide a single helical pathway for the emulsion 112 (FIG. 1) to traverse. Alternatively, the static mixer 214 in FIG. 3B may be characterized as comprising two discrete static mixers arranged in series within the inner flowpath 206. The inlet distributor 300b may also include the center baffle 302 as in FIG. 3A.

In FIG. 3C, the inlet distributor 300c includes the static mixer 214 as in FIG. 3B, but may extend into the region between the upper and lower outlet nozzles 208a,b. In other embodiments, however, the static mixer 214 may terminate at the lower outlet nozzle 208b and may alternatively include the upper static mixer 224 positioned between the upper and lower nozzles 208a,b. In the illustrated embodiment, the upper static mixer 224 provides a single helical pathway for the emulsion 112 (FIG. 1) to traverse.

In FIG. 3D, the inlet distributor 300d includes the static mixer 214 as in FIG. 3B, and also includes the upper static mixer 224 positioned between the upper and lower nozzles 208a,b. In the illustrated embodiment, the upper static mixer 224 provides multiple helical pathways for the emulsion 112 (FIG. 1) to traverse. In some applications, the upper static mixer 224 of FIG. 3D may be referred to as a "double upper mixer."

In FIG. 3E, the inlet distributor 300e includes the static mixer 214 as in FIG. 3B, and also includes the upper static mixer 224 as in FIG. 3D. The inlet distributor 300e may also include the center baffle 302 centrally located within the inner flowpath 206 and positioned axially between the upper and lower outlet nozzles 208a,b. The disc 304 of the center baffle 302 may interpose the static mixer 214 and the upper static mixer 224. In at least one embodiment, the disc 304 may be coupled to the upper static mixer 224, but could alternatively be secured to other structure, such as the inner wall of the riser 202.

In FIG. 3F, the inlet distributor 300f includes the static mixer 214, which may define or otherwise provide multiple helical pathways extending in parallel along an axial length of the riser 202. Moreover, the static mixer 214 may change (e.g., reverse) rotational direction at an axial location 308b along the length of the riser 202. The inlet distributor 300f may also include the upper static mixer 224 as in FIG. 3D and the center baffle 302 as in FIG. 3E.

In FIG. 3G, the inlet distributor 300g includes the static mixer 214 as in FIG. 3F, the upper static mixer 224 as in FIG. 3D, and the center baffle 302 as in FIG. 3E. As illustrated, the inlet distributor 300g may further include a second center baffle 310, similar to the first center baffle 302 but arranged within the inner flowpath 206 below the lower outlet nozzle 208b and preceding the static mixer 214. In at least one embodiment, the disc 304 of the center baffle 310 may be coupled to the static mixer 214, but could alternatively be secured to other structure, such as the inner wall of the riser 202.

In FIG. 3H, the inlet distributor 300h includes the static mixer 214 arranged within the region of the riser 202 between the upper and lower outlet nozzles 208a,b. In such embodiments, the static mixer 214 may be referred to as an upper static mixer, such as the upper static mixer 224 of FIG. 3D. The inlet distributor 300h may also include the center baffle 302 as in FIG. 3E. As illustrated, the inlet distributor 300h may further include a vertical baffle 216 extending longitudinally within the inner flowpath 206 and terminating at or near the lower outlet nozzle 208b. Similar to the vertical baffle 216 of FIG. 3, the vertical baffle 216 includes four longitudinally-extending walls 218 (two visible) that divide the inner flowpath 206 into a plurality of longitudinal flow channels.

Figure 3K:
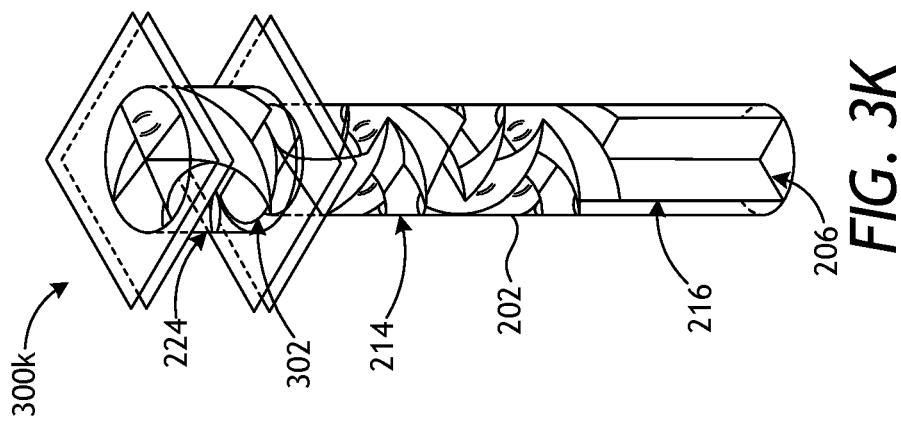
Figure 3J:
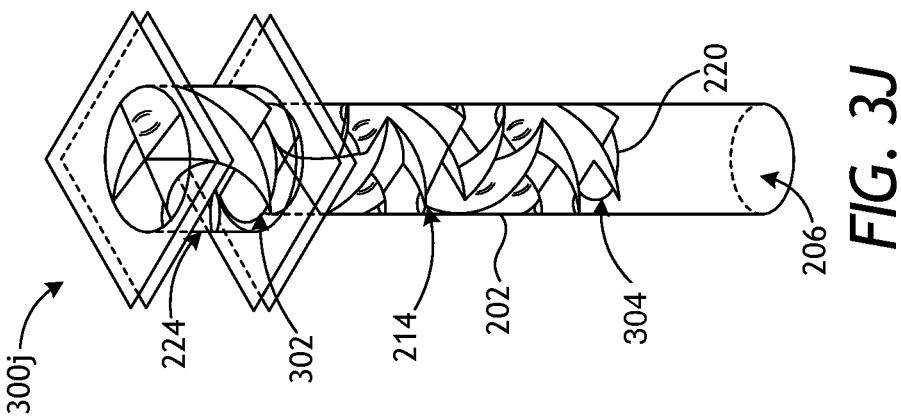
Figure 3I:
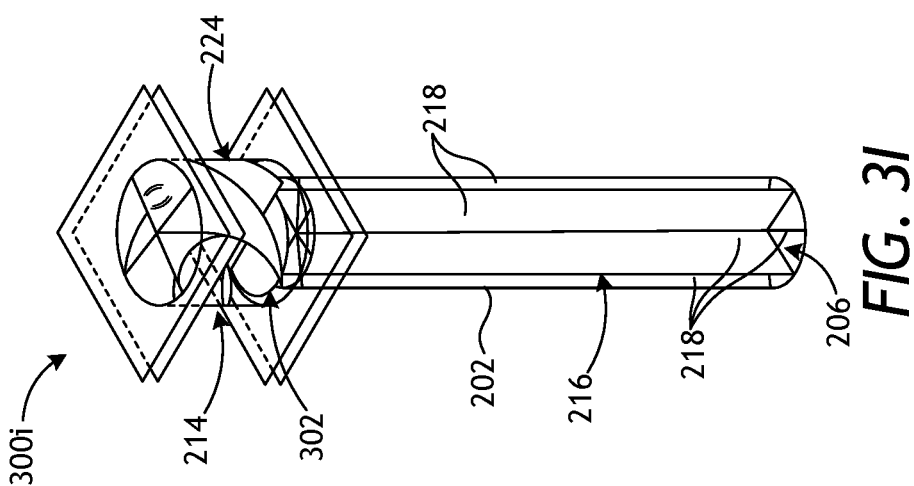

In FIG. 3I, the inlet distributor 300i includes the static mixer 214 as in FIG. 3H or alternatively the upper static mixer 224 as in FIG. 3D. The inlet distributor 300i may also include the center baffle 302 as in FIG. 3E. As illustrated, the inlet distributor 300i may further include a vertical baffle 216 extending longitudinally within the inner flowpath 206 and terminating at or near the lower outlet nozzle 208b. Unlike the vertical baffle 216 of FIG. 3H, the vertical baffle 216 of FIG. 3I includes eight longitudinally-extending walls 218 (five visible) that divide the inner flowpath 206 into a plurality of longitudinal flow channels.

In FIG. 3J, the inlet distributor 300j includes the static mixer 214 as in FIG. 3, the upper static mixer 224 as in FIG. 3D, and the center baffle 302 as in FIG. 3E. The inlet distributor 300j may further include the second center baffle 304 as in FIG. 3G. 304

In FIG. 3K, the inlet distributor 300k includes the static mixer 214, the vertical baffle 216, and the upper static mixer 224, all as in FIG. 2. Moreover, the inlet distributor 300k may further include the center baffle 302 as in FIG. 3E and otherwise interposing the static mixer 214 and the upper static mixer 224.

Based on the validated CFD model(s) mentioned above, each of the foregoing inlet distributors 300a-k reported improved performance in contrast to the prior art inlet distributors A and B mentioned above. Accordingly, including the static mixer 214, and optionally including the baffle 216, within the inner flowpath 206 may lead to better overall desalter efficiency, less corrosion/fouling issues downstream of the desalter, less environmental problems, and more production. The embodiments described herein may lead to enhanced settling of materials in the desalter. Larger water droplets initially entering the settler 102 (FIG. 1) will make for shorter settling time and the materials attached at the water-oil interface will tend to settle faster. More efficient separation will ensure minimal oil in the water that is drained out, which leads to less environmental concerns. The successful operation may also result in less water in the oil, which may lead to less corrosion problems downstream of the desalter. The improved inlet distributors described herein may also alleviate the need for a larger tank for gravity settling. More specifically, for a fixed desalter size and other things remaining the same, the throughput of the emulsion 112 (FIG. 1) can be increased due to the improved inlet distributors described herein.

Embodiments disclosed herein include:

A. An inlet distributor for a desalter unit that includes a riser having a first end, a second end, and an inner flowpath extending between the first and second ends, one or more outlet nozzles provided at the second end and in fluid communication with the inner flowpath, and a static mixer positioned within the inner flowpath and defining one or more helical pathways operable to induce rotational flow to a fluid flowing within the inner flowpath.

B. A crude oil desalter unit that includes a settler, an inlet manifold fluidly coupled to the settler, and one or more inlet distributors extending from the inlet manifold to discharge a water-in-oil emulsion into the settler, each inlet distributor including a riser having a first end, a second end, and an inner flowpath extending between the first and second ends, wherein the riser is coupled to the inlet manifold at the first end, one or more outlet nozzles provided at the second end and in fluid communication with the inner flowpath, and a static mixer positioned within the inner flowpath and defining one or more helical pathways operable to induce rotational flow to the water-in-oil emulsion flowing within the inner flowpath.

C. A method of operating a crude oil desalter unit that includes generating a water-in-oil emulsion and flowing the water-in-oil emulsion into an inlet manifold fluidly coupled to a settler, conveying the water-in-oil emulsion to one or more inlet distributors extending from the inlet manifold, wherein each inlet distributor includes a riser having a first end, a second end, and an inner flowpath extending between the first and second ends, wherein the riser is coupled to the inlet manifold at the first end, one or more outlet nozzles provided at the second end and in fluid communication with the inner flowpath, and a static mixer positioned within the inner flowpath and defining one or more helical pathways operable to induce rotational flow to a fluid flowing within the inner flowpath. The method further includes circulating the water-in-oil emulsion through the inner flowpath, subjecting the water-in-oil emulsion to centrifugal forces as the water-in-oil emulsion traverses the static mixer, and discharging the water-in-oil emulsion into the settler via the one or more outlet nozzles.

Each of embodiments A, B, and C may have one or more of the following additional elements in any combination: Element 1: wherein the one or more helical pathways extend over at least one of i) one or more full revolutions, ii) three-quarters of a full revolution, iii) half of a full revolution, iv) a quarter of a full revolution, or any range therebetween. Element 2: wherein the one or more helical pathways comprise multiple helical pathways extending in parallel along an axial length of the riser. Element 3: wherein the one or more helical pathways change rotational direction at one or more axial locations along an axial length of the riser. Element 4: wherein the static mixer comprises a plurality of static mixers arranged in series within the inner flowpath. Element 5: wherein the one or more outlet nozzles comprise a first outlet nozzle and a second outlet nozzle axially offset from the first outlet nozzle, and wherein the static mixer includes an upper static mixer axially positioned between the upper and lower nozzles within the inner flow path. Element 6: further comprising a center baffle centrally located within the inner flowpath and interposing the static mixer and the upper static mixer. Element 7: wherein the one or more outlet nozzles comprise a first outlet nozzle and a second outlet nozzle axially offset from the first outlet nozzle, the inlet distributor further comprising a center baffle centrally located within the inner flowpath and positioned axially between the upper and lower outlet nozzles. Element 8: further comprising a vertical baffle arranged within the inner flowpath and in fluid communication with the static mixer. Element 9: wherein the vertical baffle comprises one or more longitudinally-extending walls that divide the inner flowpath into a plurality of longitudinal flow channels.

Element 10: wherein the one or more helical pathways comprise multiple helical pathways extending in parallel along an axial length of the riser. Element 11: wherein the one or more helical pathways change rotational direction at one or more axial locations along an axial length of the riser. Element 12: wherein the one or more outlet nozzles comprise a first outlet nozzle and a second outlet nozzle axially offset from the first outlet nozzle, and wherein the static mixer includes an upper static mixer axially positioned between the upper and lower nozzles within the inner flow path. Element 13: wherein the one or more outlet nozzles comprise a first outlet nozzle and a second outlet nozzle axially offset from the first outlet nozzle, the inlet distributor further comprising a center baffle centrally located within the inner flowpath and positioned axially between the upper and lower outlet nozzles. Element 14: further comprising a vertical baffle arranged within the inner flowpath and in fluid communication with the static mixer, wherein the vertical baffle comprises one or more longitudinally-extending walls that divide the inner flowpath into a plurality of longitudinal flow channels.

Element 15: wherein subjecting the water-in-oil emulsion to centrifugal forces further comprises separating at least some water from oil present in the water-in-oil emulsion, and coalescing the at least some water into water droplets. Element 16: wherein each inlet distributor further includes a vertical baffle arranged within the inner flowpath and in fluid communication with the static mixer, the method further comprising dividing the inner flowpath into a plurality of longitudinal flow channels with one or more longitudinally-extending walls of the vertical baffle, and receiving the water-in-oil emulsion in the plurality of longitudinal flow channels. Element 17: further comprising feeding the water-in-oil emulsion in the plurality of longitudinal flow channels to the one or more helical pathways of the static mixer.

By way of non-limiting example, exemplary combinations applicable to A, B, and C include: Element 1 with Element 2; Element 1 with Element 3; Element 2 with Element 3; Element 5 with Element 6; Element 8 with Element 9; Element 13 with Element 14; Element 13 with Element 15; Element 14 with Element 15; and Element 16 with Element 17.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

The invention claimed is:

1. A crude oil desalter unit, comprising:
    a settler for receiving a water-in-oil emulsion;
    an inlet manifold fluidly coupled to the settler; and
    at least one inlet distributor extending from the inlet manifold into the settler to discharge the water-in-oil emulsion into the settler, each inlet distributor including:
        a vertically extending riser having a first end, a second end, and an inner flowpath extending between the first and second ends, wherein the riser is coupled to the inlet manifold at the first end;
        at least one outlet nozzle provided at the second end and in fluid communication with the inner flowpath, wherein each of the at least one outlet nozzle being configured to dispense the water-in-oil emulsion into the settler; and
        a static mixer positioned within the inner flowpath and defining one or more helical pathways operable to induce rotational flow to the water-in-oil emulsion flowing within the inner flowpath.

2. The desalter unit of claim 1, wherein the one or more helical pathways extend over at least one of i) one or more full revolutions, ii) three-quarters of a full revolution, iii) half of a full revolution, iv) a quarter of a full revolution, or any range therebetween.

3. The desalter unit of claim 1, wherein the static mixer comprises a plurality of static mixers arranged in series within the inner flowpath.

4. The desalter unit of claim 1, wherein the one or more helical pathways comprise multiple helical pathways extending in parallel along an axial length of the riser.

5. The desalter unit of claim 1, wherein the one or more helical pathways change rotational direction at one or more axial locations along an axial length of the riser.

6. The desalter unit of claim 1, wherein the at least one outlet nozzle comprise a first outlet nozzle and a second outlet nozzle vertically offset from the first outlet nozzle, and wherein the static mixer includes an upper static mixer axially positioned between the first outlet nozzle and the second outlet nozzle within the inner flow path.

7. The desalter unit of claim 6, further comprising a center baffle centrally located within the inner flowpath and interposing the static mixer and the upper static mixer.

8. The desalter unit of claim 1, wherein the one or more outlet nozzles comprise a first outlet nozzle and a second outlet nozzle vertically offset from the first outlet nozzle, the inlet distributor further comprising a center baffle centrally located within the inner flowpath and positioned axially between the first outlet nozzle and the second outlet nozzle.

9. The desalter unit of claim 1, further comprising a vertical baffle arranged within the inner flowpath and in fluid communication with the static mixer, wherein the vertical baffle comprises one or more longitudinally-extending walls that divide the inner flowpath into a plurality of longitudinal flow channels.

* * * * *